United States Patent [19]

Kato

[11] 4,133,861
[45] Jan. 9, 1979

[54] PROCESS FOR CONTINUOUS MANUFACTURE OF METHYL METHACRYLATE POLYMER PLATE

[75] Inventor: Tetsuji Kato, Otake, Japan

[73] Assignee: Mitsubishi Rayon Co., Ltd., Tokyo, Japan

[21] Appl. No.: 730,363

[22] Filed: Oct. 7, 1976

Related U.S. Application Data

[63] Continuation of Ser. No. 434,349, Jan. 17, 1974, abandoned.

[30] Foreign Application Priority Data

Jan. 18, 1973 [JP] Japan .................................. 48-8166
Jan. 18, 1973 [JP] Japan .................................. 48-8160

[51] Int. Cl.² .......................... B29D 7/14; B29D 7/22
[52] U.S. Cl. .................................. 264/216; 264/39; 264/237; 425/224; 425/230
[58] Field of Search ............. 264/216, 212, 39, 213, 264/237; 425/224, 230, 231, 232

[56] References Cited

U.S. PATENT DOCUMENTS

| | | | |
|---|---|---|---|
| 2,327,765 | 8/1943 | Carver | 264/216 |
| 2,899,402 | 8/1959 | Squire | 264/346 |
| 3,376,371 | 4/1968 | Opel et al. | 264/216 |
| 3,422,178 | 1/1969 | Junker et al. | 264/51 |
| 3,491,177 | 1/1970 | Johnson | 264/216 |
| 3,536,786 | 10/1970 | DeWitt et al. | 264/235 |
| 3,605,191 | 9/1971 | Kaspar | 425/230 |
| 3,852,387 | 12/1974 | Bortnick et al. | 264/216 |

Primary Examiner—James B. Lowe
Attorney, Agent, or Firm—Kenyon & Kenyon, Reilly, Carr & Chapin

[57] ABSTRACT

An improvement in the process for continuously manufacturing a methyl methacrylate polymer plate by polymerizing the monomer in a casting space defined by the confronting surfaces of two endless belts running in face-to-face relationship with each other is provided. The improvement is characterized in that the belts are first passed through a first polymerization zone wherein the belts are contacted by hot water, the belts leaving this zone are freed from water clinging to their surfaces, and the belts are then passed through a second polymerizing zone having a temperature above 100° C and forming the polymer plate which is then cooled at a controlled rate prior to withdrawal from the belts. The plate product has an improved heat distortion temperature.

1 Claim, 12 Drawing Figures

PROCESS FOR CONTINUOUS MANUFACTURE OF METHYL METHACRYLATE POLYMER PLATE

This is a continuation of application Ser. No. 434,349 filed Jan. 17, 1974, now abandoned.

The present invention relates to an improvement in the process for manufacturing a methyl methacrylate polymer plate in a continuous manner by polymerizing the monomer in a casting space defined by the confronting surfaces of two endless belts running in face-to-face relationship with each other.

As a process for continuously manufacturing a methyl methacrylate polymer plate of an attractive appearance, the process has been proposed and practiced wherein a methyl methacrylate monomer or a monomer-polymer mixture of methyl methacrylate is fed to one end of a space defined by the confronting surfaces of two endless belts. These belts are disposed such that their confronting surfaces are face-to-face with each other with a certain distance therebetween and run in the same direction at the same speed. The space is also defined by continuous gaskets running along both side portions of the confronting surfaces of the belts such that they are held between the confronting surfaces of the belts, thus, the monomer or monomer-polymer mixture is polymerized with the advance of the belts. The resulting polymer plate is withdrawn from the other end of said space.

In this process for the continuous manufacture of polymer plates, one or more polymerization zones are provided so that the polymerization proceeds with the running of the two endless belts. The polymerization is effected generally by external heating of the belts. Methods for the external heating include, for example, directing a hot air stream to the outer surfaces of the belts, spraying hot water in the form of a shower, passing the belts through a hot water bath and directing infrared rays on the belts. The polymerization temperature may be constant all over the polymerization zone or varied gradually or by irregular or regular gradations. Although the polymerization temperature must be determined depending upon the particular polymerization catalyst used, it is important to maintain the polymerization temperature lower than the boiling point of the liquid feed, i.e. lower than approximately 100° C under the greater part of the polymerization is completed. Polymerization, which is effected until it is almost completed, is hereinafter referred to as the "first polymerization" and the zone in which the first polymerization is effected is hereinafter referred to as the "first polymerization zone".

However, when polymerization is carried out only at such temperatures, the polymerization substantially stops in an incomplete state although the greater part of the polymerization is completed. The polymer product so obtained, in the form of a plate, contains approximately 10% by weight, of unpolymerized monomer, and is poor in quality. Therefore, the polymer plate is generally heated at a temperature exceeding 100° C in order to reduce the content of residual monomer and to improve the quality of the plate.

It is possible to withdraw a plate containing approximately 10% of the unreacted monomer from the apparatus and it is also possible to heat the withdrawn plate at a temperature exceeding 100° C to thereby reduce the content of the residual monomer. However, it is very difficult to heat the plate without damage to the appearance and configuration. In view of the foregoing, it is preferred that the plate is heated at such a high temperature before withdrawal from the apparatus, i.e. while it is still held between the confronting belts of the apparatus. Adoption of this heating method has heretofore been proposed in known processes and apparatuses for the continuous manufacture of plates as referred to in U.S. Pat. Nos. 3,376,371 and 3,371,383 and Japanese Patent Publication No. 34815/1972. Polymerization, which is effected to reduce the content of the residual monomer by the foregoing heating, is hereinafter referred to as the "first polymerization", and the zone in which the second polymerization is effected, is hereinafter referred to as the "second polymerization zone".

In the continuous manufacture of polymer plates through the foregoing first and second polymerizations, the following two problems occur.

The first problem arises when the first polymerization is carried out by a heating method such as spraying hot water in the form of a shower onto the bels or passing the belts through a hot water bath: the endless belts are transferred into the second polymerization zone accompanied by water clinging to the outside surfaces of both the upper and lower endless belts, to the outer walls of the endless gaskets and to the portions of both belts located outside the outer walls of the endless gaskets. This clinging water always remains unless it is somehow removed and creates the following disadvantages.

(1) Especially in the event that the water remains in the form of a drop or a pool, when the water is evaporated at the subsequent second polymerization zone, a longer time is required before a prescribed temperature is reached than in the case when no water is present. This requires a temperature within the oven higher than necessary or a more extensive length of the belts than necessary, incurring serious economic loss.

(2) It is difficult to uniformly heat the entire polymer plate in the second polymerization zone. This leads to the reduction in quality of the finished plate.

(3) When a polymer plate is taken out from between the belts without having had water effectively removed, water clinging to the outside surfaces of both the upper and lower belts is trapped by the main pulleys serving to tighten the belts, and forms a pool which gradually increases and, finally, expands beyond the belt edges onto the opposing surfaces of the belts. Furthermore, water clinging to the belt edges is sucked into the space between either or both of the inner surfaces of the belts and the polymer plate under the influence of a temporary vacuum effect occurring when the polymer plate is peeled off from said inner surfaces of the upper and lower belts is sucked into said space and clings to the inner surfaces of the belts and the surfaces of said polymer plate, which leads to serious damage of the appearance, i.e. staining both of said inner surfaces of the belts and of said plate surfaces. To remove this stain without any damage to these surfaces, an extremely careful operation is required with serious loss of working time.

The second problem, which is more serious than the first set forth above, is that process steps subsequent to the step of heating the plate for the second polymerization, including the step of withdrawing the plate product from the apparatus, exert great influences on the quality of the products. More particularly, conditions under which the polymer plate is cooled after the second polymerization zone exert great influences on heat distortion temperature of the finished product.

It is, therefore, a primary object of the present invention to provide a methyl methacrylate polymer sheet or plate of high quality, particularly with an enhanced heat distortion temperature by solving the aforesaid first problem so that the plate leaving the second polymerizing step is uniformly heated so as to permit a solution for said second problem by a new plate cooling procedure.

Other objects and advantages of the present invention will be apparent from the following description.

In accordance with one aspect of the present invention, there is provided an improvement in the process for the continuous manufacture of a methyl methacrylate polymer plate wherein methyl methacrylate or a monomer mixture of methyl methacrylate and a copolymerizable unsaturated compound or a partial polymerization product thereof is introduced into one end of a space defined by the confronting surfaces of two endless belts running in a face-to-face relationship with a certain distance therebetween and by endless gaskets running in compliance with said belts such that they are held between the two belts, and the monomer or monomer-polymer mixture is continuously polymerized in said space. The polymer plate is then withdrawn from the other end of said space, and said improvement is characterized in that a polymer plate heated to a temperature of 120 to 160° C in the final step of the polymerization is cooled at a cooling rate of not higher than 20° C per minute at least while the temperature of the polymer plate is between 120° C and 105° C, while being held between the endless belts. This provides a solution to the aforesaid second problem if the plate is uniformly heated in the final step, thus introducing the need for solving the aforesaid first problem.

In accordance with another aspect of the present invention, to solve the aforesaid first problem there is provided an improvement in the process for the continuous manufacture of a methyl methacrylate polymer plate as defined above, said improvement being characterized in that in the vicinity of the outlet of the polymerization zone wherein hot water is employed for heating the content of the belts to be polymerized, and in a region upstream to the subsequent zone of a higher temperature, water clinging to the surfaces opposite to the confronting surfaces of both the upper and lower endless belts, to the outer walls of the endless gaskets and to the portions of both the belts located outside the outer walls of the endless gaskets, is removed continuously within a short period of time.

The liquid feed, which is used as a starting material for the continuous manufacture of a polymer plate, is methyl methacrylate or a mixture of methyl methacrylate and an unsaturated monomer copolymerizable with methyl methacrylate, or a monomer-polymer mixture which is prepared by partially polymerizing methyl methacrylate or the monomer mixture set forth above or by blending the monomer with the polymer thereof. For brevity, these are hereinafter referred to as "liquid feed" or "liquid material". Therefore, a polymer plate or sheet which is produced is interpreted as including both homopolymer and copolymer of methyl methacrylate.

The copolymerizable unsaturated monomer includes, for example, monoethylenically unsaturated compounds such as methyl acrylate, ethyl acrylate, ethyl methacrylate, acrylic acid, styrene, α-methylstyrene, acrylonitrile and vinyl acetate, and polyfunctional compounds such as glycol dimethacrylate, diallyl methacrylate, diallyl phthalate and diethylene glycol bisallylcarbonate. Preferably, these copolymerizable unsaturated monomers should be present in the monomer mixture in an amount no greater than 20% by weight, preferably no greater than 10% by weight.

The liquid feed contains a polymerization initiator incorporated therein. The polymerization initiator includes, for example, free-radical initiators such as azobisisobutyronitrile, azobisdimethylvarelonitrile, azobiscyclohexanenitrile, benzoyl peroxide, lauroyl peroxide, acetyl peroxide, caprylyl peroxide, 2,4-dichlorobenzoyl peroxide, isopropylperoxy dicarbonate, isobutyryl peroxide and acetylcyclohexyl sulfonyl peroxide. It also includes a redox catalyst combination such as a combination of peroxides and amines. The liquid feed can be incorporated with various additives such as stabilizers, plasticizers, molecular weight-controlling agents, fillers, dyes, pigments and releasing agents, as long as the polymerization is not negatively influenced by the addition of these additives.

The invention will be illustrated with reference to the accompanying drawing, but should not, in any sense, be considered limited only to this embodiment.

Figure 1:
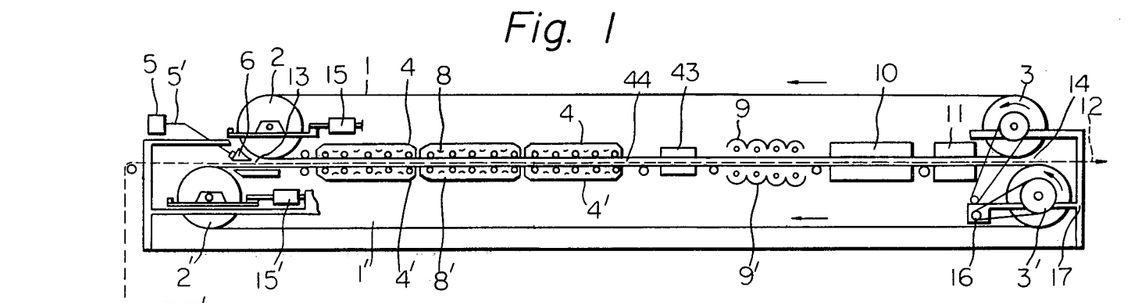
FIG. 1 is a side elevational view of an apparatus for continuously manufacturing a polymer plate according to the present invention, illustrating schematically the horizontal arrangement of the upper and lower endless belts.

Referring to FIG.1, 1 and 1' indicate upper and lower endless belts, respectively, each of which is generally made of steel or stainless steel. The external surfaces of the belts 1 and 1' are carefully polished and in some particular cases, plated so that a plate with excellent smooth surfaces can be produced. The endless belts 1 and 1' are usually 0.1 to 3 millimeters thick and preferably 0.5 to 2 millimeters thick. The two endless belts 1 and 1' are stretched by a pair of main pulleys 2 and 3, and 2' and 3', respectively, and thus given a necessary tension for preventing relaxation of the endless belts. In the apparatus of FIG. 1, main pulleys 2 and 2' are provided with hydraulic cylinders 15 and 15', respectively, to control the tension present in the belts 1 and 1' by changing their hydraulic pressure applied to the cylinders. Alternatively, it is possible to employ a spring or other mechanical elements to adjust the tension of the endless belts. Although it is desirable that the tension of each endless belt 1 or 1' be increased as much as possible to improve the accuracy of the thickness of the plate produced, the tension is generally maintained at 3 to 15 kg/square millimeter. In FIG. 1, the endless belts 1 and 1' are driven so as to run about main pulleys 2 and 3, and 2' and 3', by the main pulleys 3 and 3' in a manner described in detail in Japanese Patent Publication No. 33494/1972. The main pulleys 3 and 3' are associated with a drive source 16, such as an electric motor, to derive drive forces via belt and pulley mechanisms. However, the endless belt drive mechanism described in Japanese Patent Publication No. 33496/1972 may also be utilized in this invention. The running direction and the running speed of both upper and lower endless belts 1 and 1' are always kept equal. The possible snaking movement of the upper or lower endless belt can be controlled by changing the angularity between the rotating axes of the main pulleys 2 and 3, or 2' and 3'. The change of the above-mentioned angularity can be attained by means of a hydraulic cylinder or appropriately designed mechanical devices. The snaking movement of the endless belts 1 and 1' may also be controlled by changing the angles of the groups of rollers 4 or 4' which rotate in contact with and support the rear surfaces of the endless belts 1 and 1', with respect to the running direction of the endless belts. The reference numeral 5 designates a device for supplying a liquid feed, as set forth hereinbefore, by way of a conduit 5' into a liquid feeding device 6 mounted on a feeding device carrier (not shown in FIG. 1). The supplying of the liquid feed is usually effected by a quantitative pump (not shown) at a constant rate. The liquid feeding device 6 feeds the liquid feed supplied from device 5 into a horizontal space defined between two horizontally extending working lengths of the upper and lower endless belts. That is, the working lengths of both endless belts 1 and 1' mutually confront, and are vertically spaced apart. At the longitudinally opposite extreme ends of the space formed between the working lengths, an inlet opening 13 and an outlet opening 14 of the apparatus are formed. The performance of the liquid feeding device 6 may be the same as a known device described in Japanese Patent Publication Nos. 41602/1971, and 34815/1972 and French Pat. No. 2,027,385, although small mechanical modifications may be made so as to fit it for use in the apparatus according to the present invention.

Numerals 7 and 7' indicate sealing gaskets which are continuously fed into the transversely opposite sides of the confronting belt working lengths of the two endless belts 1 and 1', and run with the running endless belts, while preventing leakage of the liquid feed from the space defined by the belt working lengths and the gaskets. In other words, the sealing gaskets 7 and 7' close and tightly seal the transversely opposite side openings formed between the belt working lengths. The gaskets may be made of, for example, non-rigid polyvinyl chloride, polyethylene, an ethylene-vinyl acetate copolymer, polyurethane and other similar materials. A suitable gasket is described in Japanese Patent Publication No. 49823/1972.

The groups of rollers 4 and 4' supporting the endless belts 1 and 1' should be arranged at intervals so that the rollers press the belts on the gaskets and the liquid material being continuously conveyed does not leak out of the space at or befoe the first polymerization zone. The endless belts 1 and 1' undergo bending due to the hydraulic pressure of the liquid material and the repellent force of the running sealing gaskets 7 and 7', at each part of the endless belt between adjacent rollers 4 or 4'. However, if this bending exceeds a certain limit, the thickness of the plate product becomes unacceptable. Also, if any gap develops between the endless belt and the sealing gaskets due to the bending of the endless belt, the liquid material may leak out, or exterior air may intrude through the gap whereby bubbles or foam forms in the liquid material to be polymerized. It can, therefore, be understood that any means which can minimize the bending of the endless belt can also result in remedying of the foregoing troubles. One remedy is to shorten the spacing between adjacent rollers 4 and 4' as well as to increase the belt tension. In this case, the spacing between respective adjacent rollers (the distance between the centers of the two immediately neighbouring rollers) should preferably be 20 to 100 centimeters. The rollers 4 and 4' are also disposed so that they can automatically follow the reduction in the thickness of the polymerized material which reduction takes place because of contraction of the material while being polymerized between the endless belts, and also so that they can always keep contact with the rear surfaces of the endless belt. Rather than ring rollers 4 and 4', a mechanism described in Japanese Patent Publication No. 33498/1972 may be utilized in the process according to the present invention for supporting the endless belts.

Numerals 8 and 8' designate hot water spray systems arranged in the first polymerizing zone and used for heating the endless belts passing through the first polymerizing zone in order to raise the temperature of the endless belts to a required level for polymerization of the liquid material, by spraying hot water on the rear surfaces of the belts. Instead of the hot water spray system, the endless belts can be passed through a hot water bath, although this not shown in FIG. 1. The temperature of the hot water may be 100° C or less, but usually temperatures of 60° C to 95° C are preferred in order to obtain rapid polymerization. The rapid polymerization serves to avoid use of larger continuous polymerization equipment and helps to increase the productivity of the plate product.

Water clinging to the rear surfaces, i.e. the surfaces opposite the confronting surfaces, of both the upper and lower endless belts, to the outer wall of the gaskets and to the portions of both the belts located outside the outer walls of the gaskets is removed at 43 in the vicinity of the outlet 44 of the first polymerization zone and in a region upstream to the subsequent second polymerization zone of a higher temperature. Details of water removal will be illustrated later with reference to FIGS. 3 through 8.

Numerals 9 and 9' designate infrared heaters which are provided at the second polymerization zone of the apparatus and are used for heating the plate product between the endless belts to a temperature higher than approximately 100° C to remove the residual monomer from the plate product after the first polymerization. A hot air blast type heater may be substituted for the heaters 9 and 9'.

Numerals 10 and 11 designate temperature controlling zones which serve for appropriately cooling the plate product at a controlled cooling rate to a required temperature after the plate product has passed through the second polymerization zone. Details of the second polymerization and said temperature controlling zones 10 and 11 are illustrated later with reference to FIG. 2.

Numeral 12 indicates a finished plate product obtained from output opening 14 of the apparatus. Numeral 17 indicates a framework of the apparatus of FIG. 1.

Figure 2:
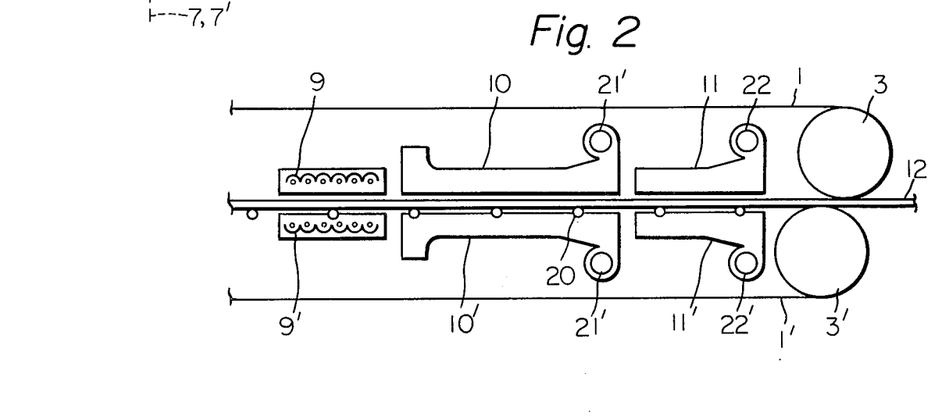
FIG. 2 is an enlarged side view of the second polymerization zone and the cooling zones shown in FIG. 1.

Referring to FIG. 2, the polymer plate is heated to temperatures of 120 to 160° C by infrared heaters 9 and 9' in the second polymerization zone. The infrared heaters 9 and 9' are provided preferably in part of the first half of a duct, which envelops the infrared heaters and the belts running therethrough. The polymer plate heated to the desired temperature by the heaters passes through the second half of the duct for the purpose of preventing heat loss. Then, the polymer plate is cooled in the first and second temperature controlling zones. The device for the first temperature controlling zone comprises ducts 10 and 10' provided with blowers 21 and 21', respectively. The ducts 10 and 10' prevent the heat from diffusing into the atmosphere. The cooling rate of the polymer plate can be suitably controlled by adjusting the feed rate and the temperature of air blown from the blowers 21 and 21' into the ducts 10 and 10'. Similarly, the device for the second temperature controlling zone comprises ducts 11 and 11' provided with blowers 22 and 22', respectively. The second temperature controlling zone device is provided to suitably adjust the temperature of the polymer plate 12 prior to being parted from the belts 1 and 1'. The belts 1 and 1' are supported by groups of rollers 20. The so cooled polymer plate 12 is parted from the belts 1 and 1' at points at which each belt comes in contact with main pulley 3 or 3'.

In the second polymerization zone, it is possible to sufficiently reduce the content of the residual monomer in the polymer plate by heating the plate to a temperature of approximately 100° C to 120° C if the heating is continued for a long period of time. However, such a temperature is not preferable because this requires an increase in size and capacity of the apparatus and results in a reduction of manufacturing efficiency. As the heating temperature adopted in the second polymerization zone increases, the initial rate of reduction of the monomer content in the second polymerization zone increases, but the monomer content in the polymer plate coming from the second polymerization is still relatively high. When the polymer plate is heated at a temperature exceeding approximately 160° C in the second polymerization zone, the plate product cannot be put to practical use. Accordingly, the polymer plate should be heated at a temperature of 120° C to 160° C, preferably 120° to 145° C.

In order to reduce as much as possible the content of the residual monomer in the polymer plate within a short period of time, the temperature distribution over the length of the second polymerization zone should preferably be established as follows. That is, the temperature should preferably be from 130° to 160° C, more advantageously 135° to 145° C at the initial part of the second polymerization zone. This increases the initial rate of reduction of the monomer content, i.e. rapidly reduces the monomer content to a certain level. At the subsequent part of the second polymerization, the temperature is gradually lowered so that it is from 120° to 140° C, preferably 125° to 135° C, at the outlet of the second polymerization zone.

The polymer plate should be heated in the second polymerization zone so that the temperature distribution in the widthwise direction of the polymer plate is narrowed as much as possible. In general, side end portions of the endless belt tend to be more readily cooled than the other portions. Accordingly, the second polymerization zone is so designed that heating and temperature maintenance are intensified on both side portions of the belts.

Since the polymer plate coming from the second polymerization zone is of a temperature between 120° C and 160° C, preferably between 125° to 135° C, some problems arise if the plate is to be released from the belts as it is. One problem is that, since the above temperature is generally higher than the heat distortion temperature of the plate, it is readily deformed while it is cooled to room temperature. Another problem is that, since an adhesion force between the polymer plate and the metal belt is high at the above temperature, the polymer plate is incapable of being parted smoothly from the belt, and portions are torn off and fragments adhere to the belt. Therefore, it is necessary to cool the polymer plate before releasing it from the belt. It is preferred that the temperature of the polymer plate be lower than 105° C, advantageously lower than 90° C, at the time of parting. The manner whereby the polymer plate is cooled is not significant. Either of two methods can be employed: one involves air blown against the polymer plate and the other uses a cooling liquid medium such as water, but generally, the former is preferred. In case the cooling is effected with the use of water, the belts and the plate tend to be contaminated when the plate is parted from the belts.

It has now been found that, if the first temperature controlling zone is shortened and the cooling rate is elevated so as to improve the manufacturing efficiency without increasing the size and capacity of the apparatus, the heat distortion temperature of the resulting polymer plate is low. Accordingly, in order to obtain a polymer plate having an enhanced heat distortion temperature, it is desirable to cool the polymer plate at a reduced cooling rate. Thus, it has been found that the polymer plate which has passed through the second polymerization zone and heated at a room temperature of 120° C to 160° C should be cooled at a cooling rate of not higher than 20° C per minute at least while it is cooled from approximately 120° C to approximately 105° C or lower in order to obtain a satisfactory heat distortion temperature. Although the cooling rate should preferably be reduced as much as possible for attaining a higher heat distortion temperature, too low a cooling rate results in reduction of the manufacturing efficiency and the necessity to enlarge the size and capacity of the apparatus. The minimum permissible cooling rate is approximately 0.5° C per minute from the industrial viewpoint. In case the cooling rate tends to become higher than the upper limit, i.e. 20° C per minute, it is desirable to provide a suitable temperature-maintaining means in the first temperature controlling zone so as to control the cooling rate within the range of 0.5° C to 20° C per minute.

The cooling rate at which the polymer plate is cooled from a temperature, at which it is maintained in the second polymerization zone, to approximately 120° C is not critical. That is, cooling rates of higher and lower than 20° C per minute may be employed.

The polymer plate is parted from the belts usually at a temperature lower than 90° C, preferably between 75 to 85° C. The cooling rate, at which the polymer plate is cooled from approximately 105° C to said parting temperature, is also not critical. Cooling rates of higher and lower than 20° C per minute may be employed, but a relatively high cooling rate is preferred in view of cooling efficiency.

Methods and apparatuses for removing water clinging to the belts and the gasket which have passed through the first polymerization zone will be illustrated with reference to FIGS. 3 through 8.

Water clinging to the surfaces opposite the confronting surfaces of both the upper and lower endless belts can be addvantageously removed at a zone adjacent the outlet of the first polymerization zone by methods such as wiping off the water with sponge rollers and blowing off the water with compressed air.

Figure 3:
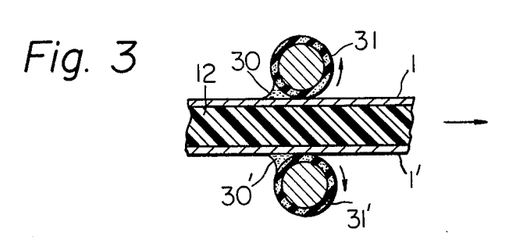
FIG. 3 is a side view showing means for wiping off water clinging to the surfaces opposite the confronting surfaces of the belts, comprising sponge rollers.

One preferred embodiment of the method involving wiping off the water with sponge rollers is shown in FIG. 3. Referring to FIG. 3, sponge rollers 31 and 31′ are provided on the surfaces opposite the confronting surfaces of both the upper and lower endless belts 1 and 1′, respectively, at a zone adjacent the outlet of the polymerization zone. The sponge rollers 31 and 31′ are rotatable around their own axes and extend parallel to the surfaces of the belts in contact with the surfaces of the belts 1 and 1′, respectively, so that the sponge rollers 31 and 31′ rotate in the direction, along which the belts 1 and 1′ run, and interrupt the progress of and absorb water clinging to the surfaces of the belts 1 and 1′. As these sponge rollers 31 and 31′ are pressed against the upper and lower belts 1 and 1′, respectively, water is first absorbed in the sponge and then squeezed out along the areas where the sponge rollers come into contact with the surfaces of the belts 1 and 1′. The water 30′ clinging to the rear surface of the lower belt 1′ is now trapped by the sponge roller 31′. The water 30 clinging to the surface of the upper belt 1 now trapped by the sponge roller 31 is divided into a portion which drips over the side edges of the upper and lower belts 1 and 1′ and a portion which clings to the belt edges and is carried by the belt. The latter portion of the water can be removed by the means for removal of water clinging to the outer walls of the gaskets and to the portions of both the belts located outside the outer walls of the gaskets. Accordingly, said means for removal of water clinging to the area in the vicinity of the belt edges are generally located downstream with respect to the means for removal of water clinging to the surfaces of the belts.

Figure 4:
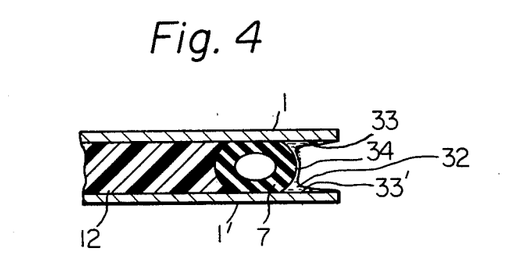
FIG. 4 is a sectional view showing the state of water clinging to the outer wall of a gasket and to portions of the belts located ouside the outer wall of the gasket.

Referring to FIG. 4, reference numeral 32 designates water clinging to the outer wall 34 of gasket 7 and to the portions 33 and 33′ of the belts 1 and 1′ located outside the outer wall 34 of the gasket 7. Reference numeral 12 is a polymer plate. This water can be efficiently removed by any one of the following methods. One method involves wiping with a sponge sheet inserted from the outside so that the sponge sheet is in contact with the opposed surfaces 33 and 33′ of the belts 1 and 1′ and the outer wall 34 of the gasket 7. Another method involves wiping with a sponge sheet in the form of doughnut which is in rotatable contact with the opposed surfaces 33 and 33′ of the belts 1 and 1′ and the outer wall 34 of the gasket 7. Still another method involves sucking the water through a vacuum nozzle. Still another method involves blowing the water off with compressed air.

Figure 5A:
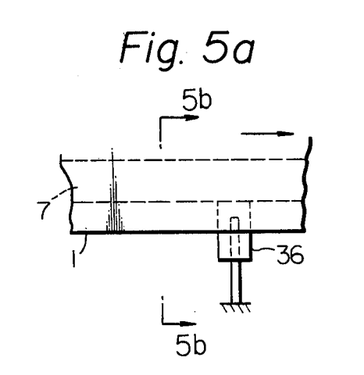
FIG. 5a and 5b are plan and sectional views, respectively, showing means for wiping off water in the state shown in FIG. 4, comprising a sponge sheet.
Figure 5B:
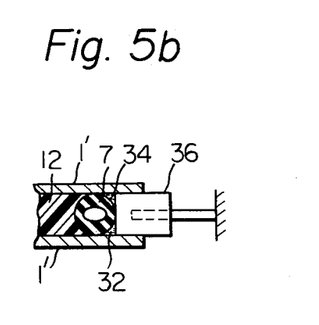

Referring to FIGS. 5a and 5b, water clinging to the outer wall 34 of the gasket 7 and to the opposed surfaces of the belts 1 and 1′ is wiped away by the sponge sheet 36. The sponge sheet 36 is inserted from the outside so as to be in contact with the opposed surfaces of the belts 1 and 1′ and the outer wall 34 of the gasket 7. The thickness of the sponge sheet 36 should be varied depending upon the desired thickness of the polymer plate 12 since the distance between the upper and lower belts 1 and 1′ varies depending on said thickness of the polymer plate 12. Although water once absorbed by said sponge sheet 36 clings to the opposed surfaces of said upper and lower belts 1 and 1′ in the form of a thin film, this is in practice negligible since said water will be completely evaporated by the heat of the belts themselves before entering into the second polymerization zone.

Figure 6A:
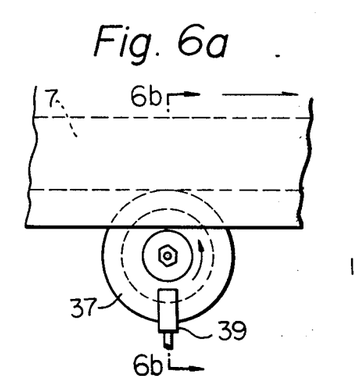
FIGS. 6a and 6b are plan and sectional views, respectively, showing means for wiping off water in the state shown in FIG. 4, comprising a sponge roller in the form of a doughnut.
Figure 6B:
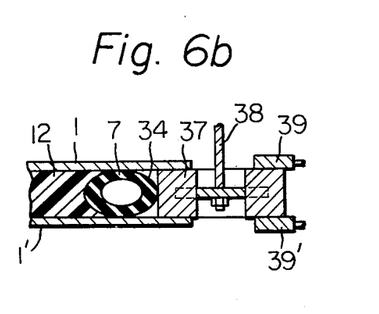

The method of FIGS. 6a and 6b is an improvement of the method of FIGS. 5a and 5b, comprising the step of rotating a sponge sheet 37 in the form of doughnut around the shaft 38, with the same, or nearly the same, peripheral velocity as the linear velocity with which the upper and lower belts 1 and 1′ run, but in the opposite direction to that in which the upper and lower belts 1 and 1′ run. Water is repelled and simultaneously wiped away by said sponge sheet 37 rotating in contact with the opposed surfaces of said upper and lower belts 1 and 1′ and the side wall 34 of the gasket 7. Water absorbed in the sponge sheet 37 may be squeezed out by pressing said sponge 37 between rollers 39, 39′ so arranged at upper and lower sides of said sponge sheet 37 that these rollers 39, 39′ may be load-adjusted from outside the belt edges. The thickness of said sponge sheet 37 should be varied depending on the distance between the belts.

Figure 7A:
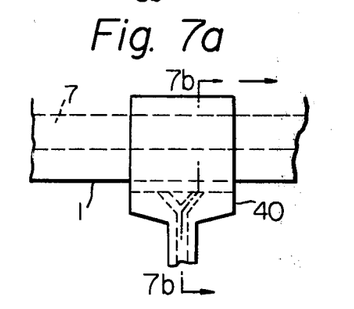
FIGS. 7a and 7b are plan and sectional views, respectively, showing means for sucking water in the state shown in FIG. 4, comprising a vacuum nozzle.
Figure 7B:
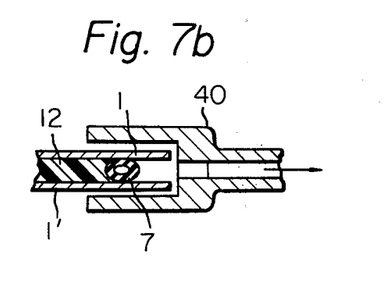

The method of FIGS. 7a and 7b comprises the step of providing a nozzle 40 so as to cover the confronting surfaces of the upper and lower belts 1 and 1′ up to adjacent the gasket 7, through which nozzle 40 water is sucked at a reduced pressure of 30 mmHg or lower. It is not necessary to exchange the nozzle 40 even when the distance between the upper and lower belts 1 and 1′ varies according to the particular thickness of the final polymer plate so long as the nozzle width is selected wider than the maximum distance of the upper and lower belts 1 and 1′.

Figure 8A:
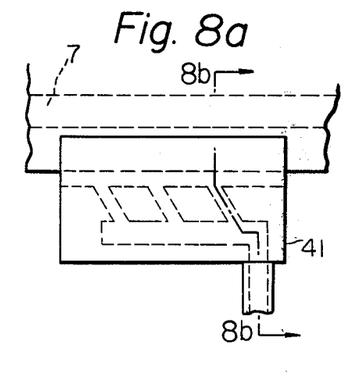
FIGS. 8a and 8b are plan and sectional views, respectively, showing means adapted for blowing away water in the state shown in FIG. 4, comprising a compressed air jet nozzle.
Figure 8B:
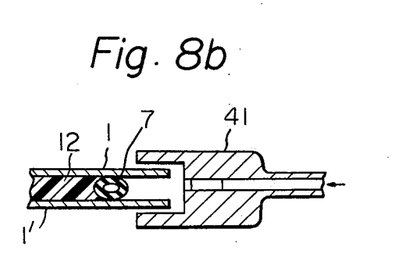

The method of FIGS. 8a and 8b comprises the step of blowing hot air through a nozzle 41 against the area in the vicinity of the belt edge so as to blow off water. The hot air should preferably be maintained at a temperature between the temperature of the hot water employed in the first polymerization zone and the temperature at which the second polymerization zone is maintained. Usually, a jet of compressed air of a 300 mmHg pressure or higher is directed against the belt edge in an upstream direction, i.e. a direction opposite that of the movement of the belts. This method is advantageous in the following points. First, it is not necessary to exchange the nozzle 41 even when the distance between the upper and lower belts 1 and 1′ is varied. Secondly, hot air does not cause the problem of reduction of the temperature of the belts 1 and 1′, which reduction may adversely affect the subsequent second polymerization zone. Thirdly, water evaporation is rapidly performed.

If room temperature compressed air is used, the upper and lower belts are cooled enough to cause separation of a polymer plate from the opposed surfaces of the upper and lower belts, breakage of said polymer plate, peeling on the surface thereof and various other problems. It is important, therefore, to previously heat the compressed air to a temperature between that of the hot water used in the first polymerization zone and that at which the second polymerization zone is maintained, before directing it onto the belt edges. It is also important that the jet nozzles are arranged so as to direct the hot air in an upstream direction, i.e. a direction opposite that of the movement of the belts, since, if the air is directed in the direction normal to the belt edges or downstream, air and water would flow toward the subsequent zone and cool this zone.

EXAMPLE 1

A syrup having a viscosity of 1.0 poise, as measured at 25° C, was prepared by blending 20% by weight of polymethyl methacrylate having an average polymerization degree of approximately 900 with monomeric methyl methacrylate. Then, 0.05% by weight of azobisisobutyronitrile as a polymerization catalyst and 0.05% by weight of silicone as a releasing agent were added to the syrup.

Using the apparatus shown in FIG. 1, a polymer plate was continuously manufactured from the syrup so prepared. The syrup was fed at a constant flow rate by means of a metering pump from a syrup preparation vessel 5 through a syrup feeding means 6 into the space formed between the confronting surfaces of two endless belts 1 and 1'. Each of the belts 1 and 1' was polished stainless steel belt having a thickness of 1 mm and a width of 1200 mm. A tension was given to the belts by main pulleys 2 and 2' each having a diameter of 1000 mm. The tension imposed on the belts was maintained at 5 kg/cm² by oil pressure cylinders 15 and 15', and the belts were moved forward at a velocity of 1m/min. The distance between two adjacent rollers was adjusted to 400 mm. As gaskets 7, hollow pipes composed of polyvinyl chloride blended with 60% by weight, based on the weight of the polymer, of dibutyl phthalate (plasticizer) and having an outer diameter of 6.0 mm and a thickness of 0.6 mm were employed.

The length of the first polymerization zone was 40 m. Hot water maintained at 85° C was showered on the surfaces of the belts by means of spray devices 8, 8'.

Sponge rollers were provided, as shown in FIG. 3, adjacent to the outlet of the first polymerization zone to remove water clinging to the surfaces opposite to confronting surfaces of the belts. Compressed air jet nozzles were provided as shown in FIGS. 8a and 8b at opposite sides of the belts downstream of said sponge rollers so as to direct hot air maintained at 85° C against the belt edges at an air pressure of 750 mmHg and at a flow rate of 13 m³ per minute, whereby water clinging to the walls of the gaskets and to the portions of the surfaces of the belts located outside the outer walls of the gaskets was blown off in a direction opposite that of the movement of the belts.

The length of the second polymerization zone was 10 m. In this zone, the polymer plate was heated at 135°C by infrared heaters.

The first temperature controlling zone 10 had a length of 10 m, wherein the polymer plate was cooled at a cooling rate of 3.5° C per minute by introducing air into ducts surrounding the belts and flowing air in the direction opposite that of the running direction of the belts by means of blowers while appropriately controlling the feed rate of the air. The temperature of the plate was 135°C at the inlet of the first cooling zone and approximately 100° C at the outlet of said zone.

The second temperature controlling zone 11 had a length of 2 m, wherein the polymer plate was cooled by the introduction of air. The temperature of the plate was approximately 100° C at the inlet and 80° C at the outlet. At the outlet the polymer plate could be readily parted from the belts. The polymer plate had an average polymerization degree of approximately 5000 and a thickness of 3 ± 0.3 mm. This product had an attractive appearance and a heat distortion temperature of 96° C, measured according to the method specified in ASTM D648-56. The content of the residual methyl methacrylate monomer was 1.4% by weight in this product.

Without the employment of the sponge rollers and the compressed air jet nozzles arranged adjacent to the outlet of the first polymerization zone, water clinging to the belts and gaskets was not completely evaporated in the second polymerization zone, and the residual water was spread on and stained the surfaces of the belts when the polymer plate was taken out, which, in turn, also stained the surfaces of the polymer plate and damaged the appearance of the transparent plate.

EXAMPLE 2

A polymer plate was continuously manufactured in the same manner as adopted in Example 1 except that the belt running rate was reduced to 0.65 m/min, the polymer plate was heated at 140° C in the second polymerization zone by adjusting the voltage of the electric infrared heaters, and the plate temperature was changed to 105° C at the outlet of the first temperature controlling zone and 100° C at the time of parting by adjusting the feed rates of air in the first and second temperature controlling zones, respectively. Although the parting condition was slightly bad when compared to Example 1, no other problem was encountered.

The polymer plate had a thickness of 3 ± 0.3 mm and a heat distortion temperature of 98° C. The content of the residual monomer was 1.5% by weight in the product.

COMPARATIVE EXAMPLE 1

A polymer plate was continuously manufactured in the same manner as adopted in Example 1 except that the plate maintained at 120° C at the inlet of the first temperature controlling zone was forcibly cooled to 70° C at a zone immediately downstream of the inlet of the first cooling zone at an initial cooling rate exceeding 20° C per minute. The cooling rate was 25° C per minute until it was cooled from 120° C to 103° C. In this case, the plate temperature was 55° C at the outlet of the first temperature controlling zone and 50° C at the time of parting. The polymer plate had a thickness of 3 ± 0.3 mm and a heat distortion temperature of 91° C.

EXAMPLE 3

A syrup having a viscosity of approximately 10 poise, as measured at 25° C, and containing approximately 30% by weight of a methyl methacrylate polymer was prepared by polymerizing methyl methacrylate. Then, 650 ppm of azobisisobutyronitrile as a polymerization catalyst and 30 ppm of dioctyl sulfosuccinate as a releasing agent were added to the syrup.

Using the apparatus shown in FIG. 1, a polymer plate was continuously manufactured from the syrup so prepared. The syrup was fed at a constant flow rate by means of a metering pump from a syrup reservoir 5 into the space formed between the confronting surfaces of two endless belts 1 and 1'.

Each of the belts 1 and 1' was polished stainless steel belt having a thickness of 1.5 mm and a width of 1500 mm. A tension was given to the belts by main pulleys 2 and 2' each having a diameter of 1600 mm. The tension imposed on the belts was maintained at 10 kg/cm² by oil pressure cylinders 15 and 15', and the belts were moved forward at a velocity of 3 m/min. The distance between each pair of two adjacent rollers was adjusted to 400 mm. As gaskets 7, hollow pipes composed of polyvinyl chloride blended with 44% by weight, based on the weight of the polymer, of dibutyl phthalate (plasticizer) and having an outer diameter of 13.0 mm and a thickness of 0.8 mm were employed.

The length of the first polymerization zone was 66 m. Hot water maintained at 84° C was showered on the surfaces of the belts by means of spray devices 8, 8'.

Sponge rollers were provided, as shown in FIG. 3, adjacent to the outlet of the first polymerization zone to remove water clinging to the surfaces opposite to confronting surfaces of the belts. Doughnut-shaped sponge materials were provided, as shown in FIGS. 6a and 6b, at opposite sides of the belts downstream of the sponge rollers shown in FIG. 3, whereby water clinging to the walls of the gaskets and to the portions of the surfaces of the belts located outside the outer walls of the gaskets was wiped away.

The length of the second polymerization zone was 24 m. In the first part of this zone, the polymer plate was heated to 140° C by far infrared heaters, and then passed through the second part designed so that heat loss is prevented. The temperature of the polymer plate was 127° C at the outlet of the second polymerization zone.

The first temperature controlling zone 10 had a length of 5.4 m, wherein the polymer plate was cooled at a cooling rate of 14.4° C per minute by introducing air into ducts surrounding the belts and flowing air in the direction perpendicular to the surfaces of the belts by means of blowers while appropriately controlling the feed rate of the air. The temperature of the plate was 103° C at the outlet of said zone.

The second temperature controlling zone 11 had a length of 3 m, wherein the polymer plate was cooled by the introduction of air. The temperature of the plate was 80° C at the outlet. At the outlet the polymer plate could be readily parted from the belts. The polymer plate had a thickness of 3 ± 0.3 mm and an attractive appearance, and a heat distortion temperature of 95.1° C, measured according to the method specified in ASTM D648-56. The content of the residual methyl methacrylate monomer was 1.39% by weight in this product, as measured by gas chromatographic analysis.

COMPARATIVE EXAMPLE 2

A polymer plate was continuously manufactured in the same manner as adopted in Example 3 except that the plate temperature was changed to 128° C at the outlet of the second polymerization zone and the polymer plate was cooled at a cooling rate of 21.6° C per minute in the first temperature controlling zone and the plate temperature was 102° C at the outlet of the first temperature controlling zone.

The polymer plate had a heat distortion temperature of 92.6° C. The content of the residual monomer was 1.28% by weight in the product.

EXAMPLE 4

A polymer plate was continuously manufactured in the same manner as adopted in Example 3 except that the plate temperature was changed to 130° C at the outlet of the second polymerization zone, and the plate temperature was lowered to 103° C linearly over the length of the first temperature controlling zone, which was 9 m. The plate product had a heat distortion temperature of 96.3° C. The content of the residual monomer was 1.55%.

For the comparison purpose, the plate which has passed through the second polymerization zone was very gradually cooled to 110° C in the first temperature controlling zone and rapidly cooled in the second temperature controlling zone and then parted from the belts at 85° C. The plate product had a heat distortion temperature of 90.7° C. The content of the residual monomer was 1.56%.

EXAMPLE 5

A polymer plate was continuously manufactured in the same manner as adopted in Example 3 except that the polymer plate was heated to 146° C in the first half of the second polymerization zone and passed out of the second polymerization zone at 134° C, and then cooled to 103° C linearly over the length of the first temperature controlling zone, which was 7 m. The plate product had a heat distortion temperature of 95.8° C. The content of the residual monomer was 1.40%.

COMPARATIVE EXAMPLE 3

A polymer plate was continuously manufactured in the same manner as adopted in Example 3 except that the polymer plate was heated to 144° C in the first half of the second polymerization zone and passed out of the second polymerization zone at 132° C, and then cooled to 103° C linearly over the length (4 m) of the first temperature controlling zone at a cooling rate of approximately 29° C per minute. The plate product had a heat distortion temperature of 89.3° C. The content of the residual monomer was 1.37%.

EXAMPLE 6

A polymer plate was continuously manufactured in the same manner as adopted in Example 3 except that the following procedures and conditions were employed. The plate product was heated to 139° C in the first half of the second polymerization zone and passed out of the outlet at 138° C. The length of the second polymerization zone was 15 m. The plate was introduced into a first temperature controlling zone of a length of 9 m, and rapidly cooled to 120° C by blowing cold air thereagainst over a period of 43 seconds in the first half of the first temperature controlling zone. Thus, the cooling rate in the first half of the first temperature controlling zone was found to be approximately 25° C per minute. Then, the plate was gradually cooled to 103° C in the last half of the first temperature controlling zone. The cooling rate in the last half of this zone was found to be 5.5° C per minute. The plate product had a heat distortion temperature of 96.4° C. The content of the residual monomer was 1.66%.

For the comparison purpose, the plate of a temperature of 138° C, which has passed through the second polymerization zone, was rapidly cooled to 103° C at a cooling rate of approximately 25° C per minute by blowing cold air thereagainst in the first half of the first temperature zone. in the first half of the first temperature controlling zone. The plate was withdrawn at 102° C from the outlet of the first temperature controlling zone. The plate product had a heat distortion temperature of 89.5° C. The content of the residual monomer was 1.64%.

EXAMPLE 7

A polymer plate was continuously manufactured in the same manner as adopted in Example 3 except that the following procedures and conditions were employed. The syrup was introduced into the first polymerization zone which was provided with infrared ray heaters over a length of 6 m in the first half of this zone. The polymer plate of a temperature of 146° C, so formed in the first half of the first polymerization zone, was then cooled to 122°C by blowing cold air against the belts for approximately 50 seconds in part of the last half of the first polymerization zone, and withdrawn at 118° C from the outlet of this zone. Then, the plate, which had passed through the first polymerization zone was cooled gradually to 103° C at a cooling rate of approximately 8.3° C per minute in the first temperature controlling zone. The plate product had a heat distortion temperature of 96.4° C. The content of the residual monomer was 1.75%.

What is claimed is:

1. A process for continuously manufacturing a methyl methacrylate polymer plate, wherein a polymerizable mixture of monomer-polymer methyl methacrylate is held between continuously traveling upper and lower horizontal flat belts having side sealing gaskets held between and traveling with the belts adjacent to but at least slightly inwardly offset from the belts' side edges so as to form outwardly facing channels, passing said belts and gaskets through a first polymerization zone forming said mixture into a plate and wherein the belts and gaskets are contacted by water having a temperature of from 60° C to 100° C and so that the belts and gaskets leave this first zone with residue water clinging to their flat surfaces and in said channels, first removing said residue water from the flat surfaces of said belts by holding back the residue water thereon so as to consequently force the residue water on the upper belt's flat surface to flow transversely therefrom and drip down its side edges and subsequently removing the residue water from said channels so that all outer surfaces of said belts and gaskets are free from said residue water in excess of a film of evaporating water, and after evaporation of said film passing the belts and gaskets through a second polymerization zone heating the plate to a temperature of from 120° C to 160° C, said first removing of residual water being done by pressing rotative sponge rollers transversely on the belts' said flat surfaces so as to absorb the residue water therefrom and by rotation of the rollers return the water to the surfaces with squeezing of the rollers to squeeze out the absorbed water and said subsequent removal of the residue water from said channels being done by blowing air into said channels with the air directed in a direction opposite to the movement of said traveling belts, said polymer plate after leaving said second polymerizing zone being cooled to a temperature less than 90° C at a rate of at least about 0.5° C per minute and at a rate not more than 20° C per minute while cooling through that portion of the temperature range of about 120° to about 105° C and thereafter being withdrawn from said belts.

* * * * *

UNITED STATES PATENT AND TRADEMARK OFFICE
CERTIFICATE OF CORRECTION

PATENT NO. : 4,133,861
DATED : January 9, 1979
INVENTOR(S) : Tetsuji Kato

It is certified that error appears in the above–identified patent and that said Letters Patent are hereby corrected as shown below:

Column 1, line 48, change "under" to --until--.

Column 2, line 21, correct spelling of "belts".

Column 8, line 42, after "a" delete --room--.

Column 9, line 11, correct spelling of "advantageously--.

Column 10, line 26, after "sponge" insert --sheet--.

Column 14, lines 61-62, after "thereagainst" delete --in the first half of the first temperature zone.--.

Signed and Sealed this

Twenty-sixth Day of June 1979

[SEAL]

Attest:

RUTH C. MASON
Attesting Officer

DONALD W. BANNER
Commissioner of Patents and Trademarks